Oct. 23, 1951     U. S. DUNN     2,572,455
TRANSFORMER

Filed Oct. 22, 1949     3 Sheets-Sheet 1

INVENTOR.
Ulysses S. Dunn
BY Thiess, Olson & Mecklenburger
Attys

Oct. 23, 1951  U. S. DUNN  2,572,455
TRANSFORMER
Filed Oct. 22, 1949  3 Sheets-Sheet 2
Fig. 4
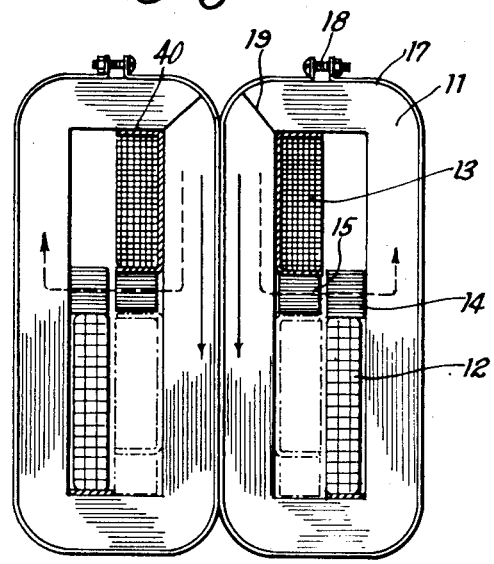
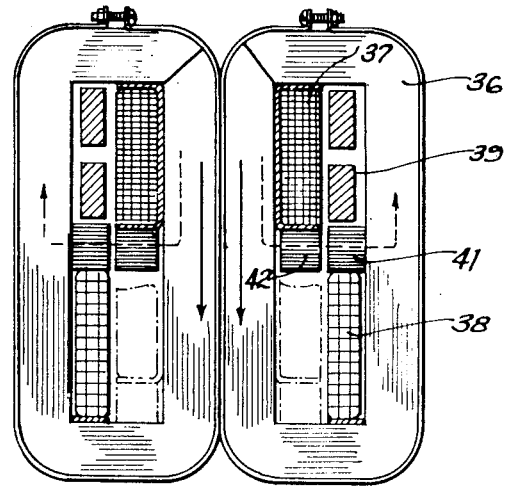
Fig. 5
INVENTOR.
Ulysses S. Dunn
BY
Thiess, Olson & Mecklenburger
Att'ys Oct. 23, 1951  U. S. DUNN  2,572,455
TRANSFORMER
Filed Oct. 22, 1949  3 Sheets-Sheet 3
Fig. 6
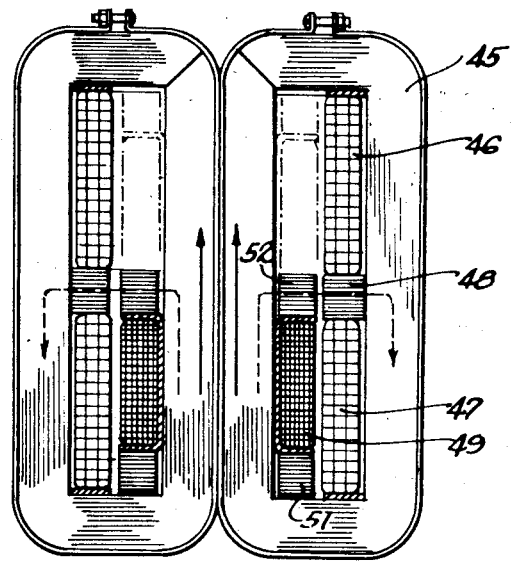
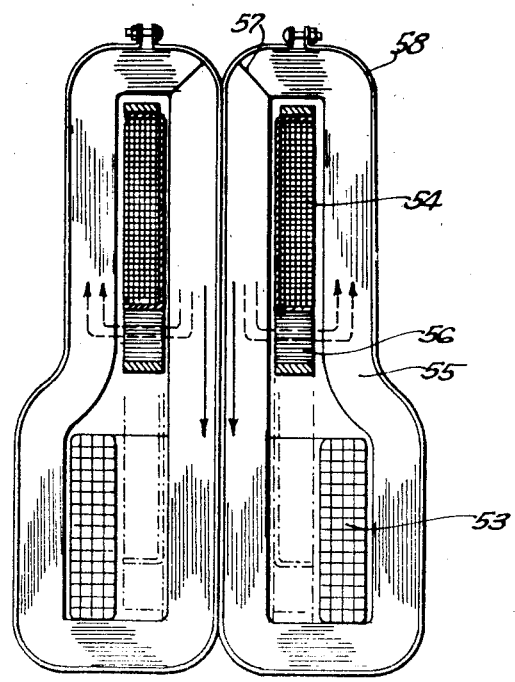
Fig. 7
INVENTOR.
Ulysses S. Dunn
BY
Thiess, Olson & Mecklenburger
attys Patented Oct. 23, 1951

2,572,455

UNITED STATES PATENT OFFICE 2,572,455

TRANSFORMER

Ulysses S. Dunn, Chicago, Ill.

Application October 22, 1949, Serial No. 123,017

10 Claims. (Cl. 171—119)

This application is a continuation-in-part of the application Serial No. 736,689, Ulysses S. Dunn, filed March 24, 1947, now Patent No. 2,511,050.

This invention relates to transformers wherein the output current of one or more secondary windings may be controlled to vary over specified limits, more particularly to such transformers having a greater degree of current control, and it is an object of the invention to provide improved apparatus of this character.

It is a further object of the invention to provide improved transformers of the character indicated which have selective control of the output current of two secondary windings such that the current in one winding decreases as it increases in the other.

It is a further object of the invention to provide improved transformers of the character indicated having controllable output of two or more secondary windings wherein the maximum demand upon the transformers is limited approximately to the maximum capacity of one of the windings.

Transformers, in general, comprise a core of laminated iron and two or more windings linking the core, one of the windings being used as a source of supply for providing an exciting field or flux within the transformer core and the other windings being used to supply loads. In transformers the flux set up by the primary or exciting winding consists of two parts, that which links with the primary and secondary windings and that which links with the primary winding alone, the latter being termed leakage flux. When a load is connected to the secondary windings so that current flows therein, a flux is created thereby which also consists of two parts, one part linking with the primary and secondary windings and a second part or leakage flux linking only with the secondary winding. The amount of current delivered to the load is a function among other factors of the leakage flux associated with each of the windings. The leakage flux is proportional to the distance between the primary and secondary coils and is inversely proportional to the length of the path which it takes as measured by the width between adjacent legs of the core. In addition to changing the core and winding dimensions, the leakage flux may also be increased by placing magnetic core material in the leakage path. The foregoing explanation is basic and is believed to be well understood by those skilled in the transformer art.

In transformers constructed particularly for welding, for example, either arc or spot welding, it is well known to utilize the leakage flux to control the amount of current needed. In these transformers one winding of the transformer is movably mounted with respect to the other for changing the spacing between the windings in order that the leakage flux may be increased or decreased as desired. When the windings are spaced as closely together as possible, the leakage flux is a minimum and the output current is a maximum. Conversely, when the windings are spaced as far from each other as possible, the leakage flux is a maximum and the current is a minimum.

In prior constructions of transformers for arc welding or spot welding, for example, the amount of control of output current has been limited. To get the necessary large spacing of the windings required for minimum current, resort has been had to long narrow cores which occupy large amounts of space. Such constructions are known wherein the primary and secondary windings telescope within each other to obtain the maximum current output as well as constructions wherein the primary coil merely lies adjacent the secondary but the two windings do not telescope within each other. It is also known to place magnetic core material in the window space of the core between the primary and secondary windings to reduce the output current. In constructions of this character the minimum current desired is produced relatively easily, but the maximum output is limited by the necessity of having a fixed minimum space between the primary and controlled secondary.

Controlling the secondary current by means of taps on the windings in general is not satisfactory for welding transformers and other heavy current apparatus.

It is a further object of the invention to provide an improved transformer wherein the foregoing indicated difficulties with the prior art are obviated and a transformer having maximum efficiency, minimum cost, and a high degree of current control is obtained.

While the invention will be described in one form as having advantageous application to a transformer for arc welding and spot welding which require a wide range of current control, it has application to other apparatus where a wide range of continuously variable current control is needed.

In carrying out the invention in one form, a transformer having a variable output is provided, comprising, a magnetic core having a window for the reception of windings, a first winding fixedly mounted in the core window, a second winding in the core window and movable relative to the first winding, and means for increasing the range of transformer current output comprising the core and at least one magnetic shunt which is movable in conjunction with the second winding.

For a more complete understanding of the invention, reference should be had to the accompanying drawings in which:

Fig. 4 is a sectional view of a transformer core and coils embodying one form of the invention;

Fig. 5 is a sectional view of a transformer core and coils embodying a further modification of the invention;

Fig. 6 is a sectional view of a transformer core and coils embodying a further modification of the invention; and Fig. 7 is a sectional view of a transformer core and coils embodying still a further modification of the invention.

Figure 2:
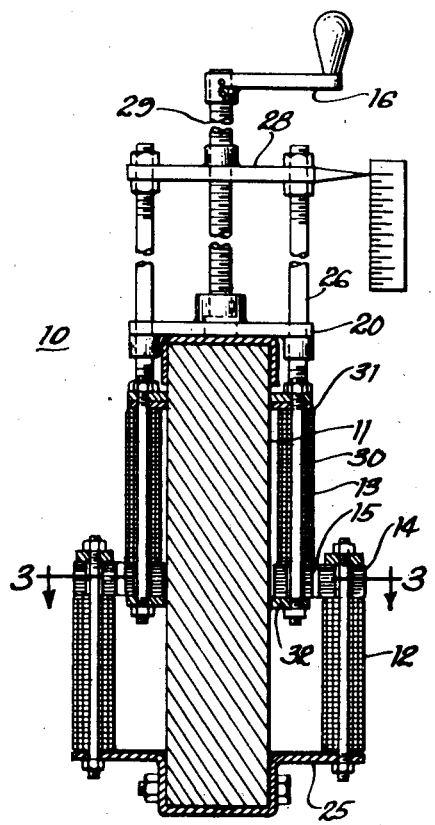
Fig. 2 is a view taken substantially along lines 2—2 of Fig. 1.

Referring to the drawings, the invention is shown embodied in a transformer 10 comprising a core 11 of laminated iron, a pair of windings 12 and 13 mounted on the core, two-part shunts 14 and 15 associated respectively with windings 12 and 13, and mechanism including a crank 16 for moving the winding 13 relative to the winding 12.

The windings 12 and 13 and the core 11 may be the same windings and core as illustrated in Fig. 4, this embodiment of the invention showing the application of the transformer to apparatus wherein the current in only one winding is controlled, that is, in secondary winding 12.

The transformer is illustrated in all views of the drawings as being of the shell type, but it will be understood that other forms of transformers may be used. The core 11 is shown as being made of two wound strips of iron which may be of any suitable magnetic grade of steel, and may be constructed of rectangular laminations or punchings, as is well understood by those skilled in the transformer art. Punched cores tend to be uneconomical because the punched-out material is useless. Core 11 may, for example, be as the one illustrated in the copending application Serial No. 736,688 wherein the core is described as consisting of a wound strip of iron which has been properly heat-treated and cut along a line 19 to provide an opening for receiving coils or windings 12 and 13. Straps of metal 17 may surround the parts of the core 11 and screws 18 may be provided for clamping the core so that the ends thereof abut tightly along line 19.

The windings 12 and 13 are wound with the number of turns to produce the voltage and other characteristics desired and are arranged surrounding the center leg of the core.

Figure 1:
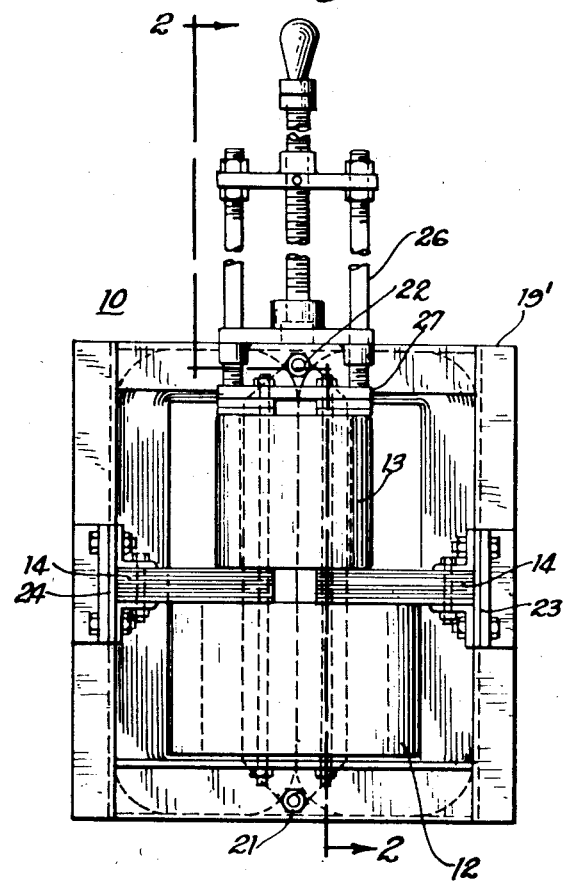
Figure 1 is a side elevational view of a transformer embodying the invention.

The core and coils illustrated in Fig. 4 are suitably supported relative to each other, as may be seen best in Figs. 1 and 2, by frame members 19' held together by bolts 21 and 22. The members of shunt 14 are held to the frame members 19' by brackets 23 and 24. Winding 12 is held between the members of shunt 14 and a mounting bracket 25 which is attached to the core as shown. A bracket 20 is attached to the upper end of the core for supporting winding 13 and for permitting the winding to be raised and lowered. For this purpose a series of rods 26 are passed through the corners of bracket 20 and are attached to plate members 27 to which the winding 13 and shunt 15 are attached by means of bolts 30. Associated with the upper end of vertical members 26 is a plate 28 threaded at the center for engaging with a screw 29 attached to crank 16. Turning crank 16 raises or lowers plate 28, and consequently vertical members 26, which are attached thereto. Accordingly, turning the crank 16 raises and lowers winding 13 and shunt member 15, the inside dimensions of the secondary coil being such as to receive the primary winding 13 and the shunt 15.

It will be understood that electrical insulating material is provided for insulating the windings from each other and also from the surrounding iron members, as is well understood in this art.

Coil guides 31 and 32 are provided at the respective ends of coil 13 for engaging with core 11 in order to properly guide the winding 13 in its upward and downward movements. Further elaboration of the supporting members, such as clamps for example, and the showing of leads and connections are not believed necessary.

Figure 3:
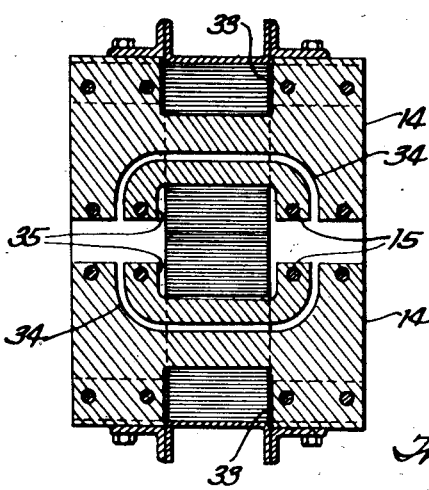
Fig. 3 is a sectional view taken substantially along lines 3—3 of Fig. 2.

The shunt 14 comprises a pair of members, as may be seen best in Fig. 3, which are constructed with cutout portions 33 within which the outer legs of core 11 are received in closely spaced relation and with cutout portions 34 to provide a space for winding 13 and the members of shunt 15 to pass therethrough. The shunt 15 consists of a pair of members, as may be seen best in Fig. 3, each having cutout portions 35 within which the inner legs of core 11 are received in closely spaced relation. The outer surface of the members of shunt 15 have a contour so as to be receivable within the cutout portions 34 of the members of shunt 14. The gap between the portions of shunt 14 and the portions of shunt 15 may be made as small or as large as desired, but in any event, it is such as to provide necessary clearance. As illustrated, the shunt construction is symmetrical on the two sides of the core and this, in combination with the shell type core, is advantageous in that the magnetic pull upon the shunts is equal on the two sides thereof. The shunts preferably are of laminated transformer iron to reduce the core losses.

In the construction shown in Figs. 1-4, it is intended that the winding 12 be the secondary or load winding and the winding 13 is intended to be the primary or exciting winding. The functions of these windings may be reversed if desired.

With the winding 13 in the position shown in Figs. 1 and 2, and by the solid lines in Fig. 4, the shunts 14 and 15 are directly opposite each other. In this situation and with the primary winding connected to voltage source of suitable voltage and frequency, the flux created by winding 13 may follow the solid arrow (Fig. 4) around the legs of core 11 and it may pass through the shunts 14 and 15, as shown by the dotted arrow, this latter flux being leakage flux. When a load is connected to winding 12 and current flows, some of the flux due thereto may also pass through the shunts 14 and 15. Consequently, in the position shown, the leakage flux will be a maximum and will represent a substantial amount of the total flux within the core. Accordingly, the current supplied by winding 12 to a load, for example a welding arc, will be a minimum and may be a very small percentage of the total current possible. When winding 13 is cranked downwardly by means of crank 16 until it occupies the position shown by the dotted lines of Fig. 4, the windings 12 and 13 are as close to each other as possible and the shunt members 14 and 15 are as far removed from each other as possible. Consequently, susbtantially all of the flux which links with one winding links with the other winding (i. e. the leakage flux is a minimum) and the current supplied by secondary winding 12 is a maximum. The secondary coil 12 preferably occupies slightly less than one-half of the length of the core window so that winding 13 is telescoped completely within winding 12.

Winding 13 may surround a wear liner 40 so as not to wear the winding insulation. This may be in addition to or instead of guides 31 and 32.

The cross section of the shunts 14 and 15 at the section of Fig. 4 advantageously may be about the same cross section as the total cross section of the center legs of the core. With such a construction the ratio of maximum to minimum current may easily be made as large as 3 to 1. By decreasing the gap between the shunts 14 and 15 and by increasing the cross-sectional area thereof, it is possible to increase the ratio to 10 to 1 even more.

Inserting and removing an iron member in the flux path to provide current control, as is known to the prior art, would not produce the same degree of control as by moving the winding with an attached shunt, for example, such as 13, into and out of telescoping relation. Thus, considering any relative position of windings 12 and 13, an iron member may be inserted into the flux path, for example, either or both of the shunt members 14 and 15 may be so placed. In no relative position of these two windings alone (as suggested by the prior art) can the same range of leakage flux be obtained so as to give the range of control as is obtainable by moving both the winding and the shunt.

In Fig. 5 there is shown an embodiment of the invention applicable to a combined arc welding and spot welding transformer. In this embodiment the arrangement of the core may be substantially the same as that described in connection with Fig. 4, and it may be mounted for relative movement of the windings in the same type of structure illustrated in Figs. 1, 2 and 3. Accordingly, there is illustrated in Fig. 5 a core 36, primary winding 37, and secondary windings 38 and 39, a fixed shunt 41 being associated with windings 38 and 39 and a movable shunt 42 being associated with primary winding 37.

The secondary winding 38 may be an arc welding secondary winding for example (about 65 volts), and winding 39 may be a spot welding secondary coil for example (about 3 volts). In the position shown, the shunt members 41 and 42 are directly opposite each other, this being the condition of maximum leakage flux as pointed out in connection with Fig. 4. In this condition, the primary winding 37 is telescoped completely into the spot welding secondary 39, and the spot welding secondary winding has maximum output since the flux of the primary winding links therewith irrespective of whether the flux passes through the shunts or through the main core. This corresponds to the condition of operation wherein the apparatus is utilized as a spot welder where the maximum current is desired. If under this condition, the secondary 38 is used as an arc welding coil, the current supplied by the winding would be a minimum.

It is pointed out that the window of core 36 is of dimensions such that when winding 37 and shunt 42 are moved to the extreme lower position within winding 38, winding 37 does not telescope completely within winding 38. This is necessary in arc welding constructions inasmuch as a substantial amount of leakage flux is desired even under maximum current conditions. That is, it is necessary to have a fixed amount of minimum transformer voltage drop in order to match the inherent characteristics of a welding arc. If winding 37 were to telescope completely within winding 38, as for example winding 13 does within winding 12 of Fig. 4, the arc welding current would become excessive.

When the winding 37 is in its lowermost position, the current available in winding 39 is reduced to a minimum due to the maximum spacing between these two windings. The ratio of maximum to minimum current for windings 39 and 37 is not so great as that for windings 38 and 37 inasmuch as winding 37 does not telescope completely into winding 38. This is satisfactory where secondary winding 39 is an arc welding secondary, since the high ratio of control is not needed for arc welding.

While secondary windings 39 and 38 have been indicated, respectively, as being useful for spot welding and arc welding, it will be understood that these windings may be constructed for other purposes. For example, if these windings are wound for equal voltage and current characteristics, it is apparent that relative movement of the primary winding 37 will cause a controlled shift of the relative output currents of the two secondary coils. If, for example, each of such coils are supplying lighting circuits, the lights of one circuit will diminish while those of the other circuit increase. Speed control of motors, and rectifier control through phase shifting could be accomplished by such a transformer. Other uses will occur to those skilled in this art.

The transformer construction of Fig. 5 provides a choice of maximum output of either of two secondary windings, that is, windings 38 and 39, but the total demand on the power source when both windings are being used is limited approximately to the maximum output of either secondary winding. This is advantageous in applications such as welders inasmuch as these are subject to demand charges for maximum power requirements.

In Fig. 6 there is illustrated an embodiment of the invention wherein the maximum ratio of current control in either of two secondary windings may be had. Accordingly, there is shown a transformer core 45 with a pair of secondary windings 46 and 47 mounted therein as shown with a fixed magnetic shunt 48 therebetween.

Core 45 may be formed in the same manner as described in connection with Fig. 4 and while windings 46 and 47 are shown substantially equal in size, these may be of any size desired. Arranged to slidably move within windings 46 and 47 is a primary winding 49 having shunts 51 and 52 attached at respective ends thereof so as to move with the primary winding.

The window in core 45 is of such dimensions that the primary winding with the two attached shunts may telescope completely within either of the secondary windings 46 and 47. Thus in the position shown by the solid lines, the shunt 52 lies directly opposite shunt member 48, and when the primary coil occupies the position shown by the dotted lines the shunt member 51 lies directly opposite the shunt member 48.

With the primary coil 49 occupying the position shown by the solid lines, the windings 47 and 49 are closely coupled, that is, the leakage flux is a minimum and the output of winding 47 is a maximum. Consequently, in so far as secondary winding 46 is concerned, there is a maximum of leakage flux since the flux passing through shunts 48 and 52, as shown by the dotted arrow, does not link winding 46. Accordingly, the output current of winding 46 is a minimum. Correspondingly, when primary winding 49 occupies the position shown by the dotted lines, i. e. the upper position, windings 49 and 46 are closely coupled with minimum leakage and consequent high current output. In this instance the leakage flux, in so far as winding 47 is concerned, is very high with consequent minimum output. Accordingly, it is apparent that when windings 46 and 47 are used together one of the windings has maximum output while the other has minimum output with complete uniform control between these two limits for each winding. This control of output is useful for example in theater lighting, certain types of motor speed control, and the control of rectifiers and similar electronic devices by means of phase shifting. Of course, either winding may be used alone with the same range of control. The range of control is limited only by the air gap between the fixed and movable shunt members and, as pointed out in connection with Fig. 4, this may easily be made as high as 3 to 1, and by reducing the air gap to somewhat smaller amounts can be made as high as 10 to 1 or more.

The constructional details of the windings and core, together with the structure for moving the primary winding, may be as illustrated in connection with Figs. 1, 2 and 3.

In Fig. 7 there is shown a variation of the invention as shown in Fig. 4 having two windings, a secondary winding 53, a primary winding 54, a core 55, and a movable shunt 56 attached to winding 54.

Core 55 is of the shell type consisting of two portions. Each portion as shown may be formed of a wound strip severed at line 57 in order to permit assembling the windings thereto, the magnetic circuit of the core being closed by means of clamping straps 58.

The core 55 is formed as shown with the core window relatively large at the bottom so as to receive secondary winding 53 and the primary winding 54 as shown by the dotted lines. Suitable clearances for permitting the necessary movements to take place are required. The upper portion of the core window is reduced so as to provide only sufficient room for primary winding 54 and the necessary clearances for permitting movement.

While the core has been illustrated as being of the wound strip type, it will be understood that it may also be fabricated by stacking punched laminations. The windings are formed and provided with insulation in a manner as is well understood in the art and the shunt members 56 are attached to coil 54 for movement relative to the secondary winding, as described in connection with Fig. 1.

When winding 54 is in the upper position, as shown by the solid lines, the shunt member 56 cooperates with the upper portion of the core legs inasmuch as these are relatively close together at this point to divert the flux from winding 53, as shown by the dotted arrows. Accordingly, in this position the leakage flux in so far as secondary winding 53 is concerned, is a maximum and the current output thereof is a minimum. The minimum amount of current may be determined by constructing the upper portions of the core such that the gap formed with shunt 56 is as narrow as necessary. When winding 54 and shunt 56 is as narrow as necessary. When winding 54 and shunt 56 occupy the lower position in the core, as shown by the dotted lines, the flux leakage with the secondary winding 53 is a maximum, leakage flux is a minimum, and the output current of winding 53 is a maximum. Any suitable range of maximum to minimum current may be obtained by properly choosing the relative dimensions of the core and the shunt.

While particular embodiments of the invention have been shown, it will be understood, of course, that the invention is not limited thereto since many modifications may be made, and it is, therefore, contemplated by the appended claims to cover any such modifications as fall within the true spirit and scope of the invention.

The invention having thus been described, what is claimed and desired to be secured by Letters Patent is:

1. A transformer having a variable output comprising, a magnetic core having a window for the reception of windings, a first winding fixedly mounted in said window, a second winding in said window and movable relative to said first winding, and means for increasing the range of transformer current output comprising cooperating magnetic shunts one of which is movable in conjunction with said second winding and another of which is stationary.

2. A transformer comprising, a magnetic core having a window for the reception of windings, a first winding fixedly mounted in said window with one end of said first winding adjacent one end of said window, a magnetic shunt fixedly mounted in said window adjacent the other end of said first winding, a second winding in said window and movable relative to said first winding, said windings being of dimensions whereby said second winding may telescope into said first winding, and a magnetic shunt attached to and movable with said second winding, said second magnetic shunt being attached to said second winding at the end respectively opposite to the end of said first winding to which said first shunt is attached.

3. A transformer comprising, a magnetic core having a window for the reception of windings, a first winding fixedly mounted in said window adjacent one end thereof, a second winding in said window adjacent the other end thereof, a magnetic shunt fixedly mounted between said first and second windings, a third winding in said window and movable relative to said first and second windings, said windings being of dimensions whereby said third winding may telescope alternately into said first and second windings, and a magnetic shunt attached to one end of and movable with said third winding.

4. An arc welding transformer comprising, a magnetic core having a window for the reception of windings, an arc welding secondary winding fixedly mounted in said window with one end of said arc welding secondary winding adjacent one end of said window, a magnetic shunt fixedly mounted in said window adjacent the other end of said arc welding secondary winding, a primary winding in said window and movable relative to said arc welding secondary winding, said arc welding secondary winding and said primary winding being of dimensions whereby said primary winding may telescope into said arc welding secondary winding, and a magnetic shunt attached to and movable with said primary winding, said second magnetic shunt being attached to said primary winding at the same end respectively of said arc welding secondary winding at which said first shunt is attached.

5. A combination arc and spot welding transformer comprising, a magnetic core having a window for the reception of windings, an arc welding secondary winding mounted in said window at one end thereof, a spot welding secondary winding mounted in said window at the other end thereof, a magnetic shunt fixedly mounted between said arc welding secondary winding and said spot welding secondary, a primary winding in said window and movable relative to said secondary windings, said windings being of dimensions whereby said primary windings may telescope alternately into said secondary windings, and a magnetic shunt attached to and movable with said primary winding at the end thereof whereby when said primary winding is telescoped with said spot welding secondary said fixed and said movable shunts are substantially adjacent each other.

6. A transformer comprising, a magnetic core having a window for the reception of windings, a first winding fixedly mounted in said window adjacent one end thereof, a second winding in said window adjacent the other end thereof, a magnetic shunt fixedly mounted between said first and second windings, a third winding in said window and movable relative to said first and second windings, said windings being of dimensions whereby said third winding may telescope alternately into said first and second windings, and magnetic shunts one of which is attached to each end of and movable with said movable winding.

7. A transformer comprising, a magnetic core having a window for the reception of windings, a first winding fixedly mounted in said window adjacent one end thereof, a second winding in said window adjacent the other end thereof, a magnetic shunt fixedly mounted between said first and second windings, a third winding in said window and movable relative to said first and second windings, said windings being of dimensions whereby said third winding may telescope alternately into said first and second windings, and magnetic shunts one of which is attached to each end of and movable with said third winding, the dimensions of said windings and shunts being such that irrespective of into which one of said first and second windings said third winding is totally telescoped, one of the shunts attached to said third winding lies adjacent said fixedly mounted shunt.

8. In an electric welder, a transformer core; primary and secondary coils arranged in concentric relationship upon said core, one of said coils being movable axially to vary the output of said secondary coil; a fixed shunt core; a movable shunt core arranged to shift with said movable coil to a position providing a maximum leakage flux through said fixed shunt core when said movable coil has the maximum separation from the other of said coils.

9. In combination, a shell type transformer core; a spot welding secondary coil on said core; an arc welding secondary coil on said core; a primary coil on said core concentric with said spot and arc welding coils and axially movable with respect to said secondary coils; shunt cores movable with said primary coil and symmetrically arranged in the windows of said shell type core; and fixed shunt cores symmetrically located in the windows of the shell type core so as to provide parallel paths for a maximum of leakage flux avoiding said arc welding secondary coil when said primary coil has its maximum coupling with said spot welding secondary coil, and said symmetrical arrangement of fixed and movable shunts being such as to balance the magnetic pull between them.

10. In combination, a transformer core; a first secondary coil on said core; a second secondary coil on said core; a primary coil on said core; a pair of shunt cores fixed with respect to and separated by said primary coil; a third shunt core between said first and second secondary coils; and means for shifting the relative positions of said third shunt core and secondary coils with respect to said primary coil and pair of shunt cores, whereby the coupling between said primary and said first and second secondary coils is continuously variable between maximum limits.

ULYSSES S. DUNN.

REFERENCES CITED

The following references are of record in the file of this patent:

UNITED STATES PATENTS

| Number | Name | Date |
| --- | --- | --- |
| 1,684,746 | Smith et al. | Sept. 18, 1928 |
| 1,720,446 | Sarazin | July 9, 1929 |
| 2,243,169 | Schwenden | May 27, 1941 |
| 2,437,021 | Fries | Mar. 2, 1948 |

FOREIGN PATENTS

| Number | Country | Date |
| --- | --- | --- |
| 6,728 | Great Britain | of 1889 |
| 441,982 | Great Britain | Jan. 30, 1936 |